Jan. 17, 1967 E. BOBARD 3,298,453
FRAME AND DRIVE ARRANGEMENT FOR AGRICULTURAL
TRACTOR HAVING TWO WHEELS IN LINE
Filed Sept. 25, 1964 2 Sheets-Sheet 2
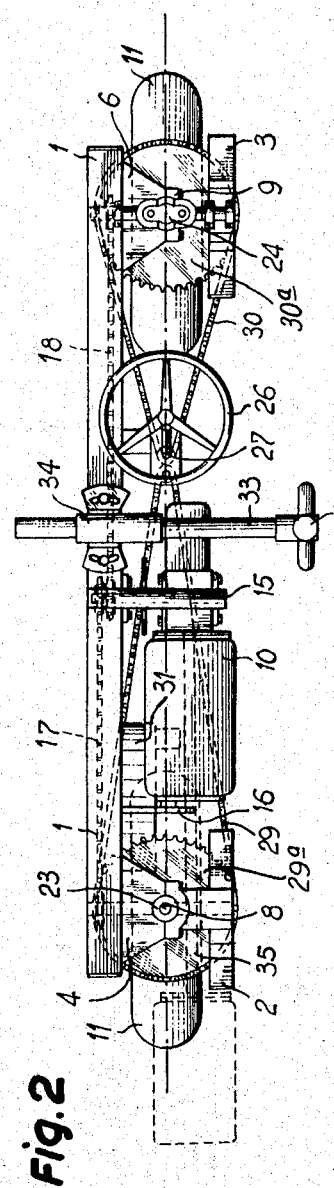
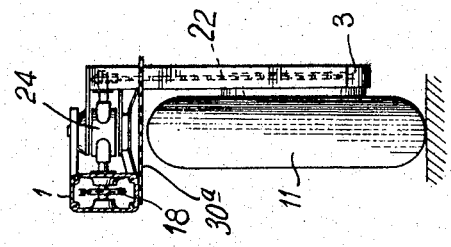
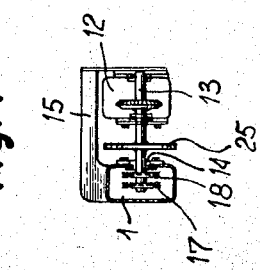
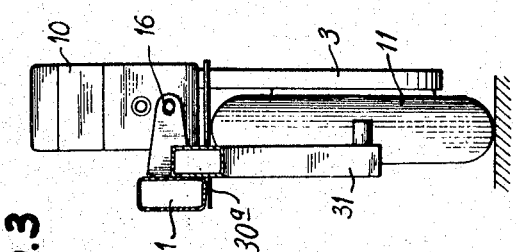

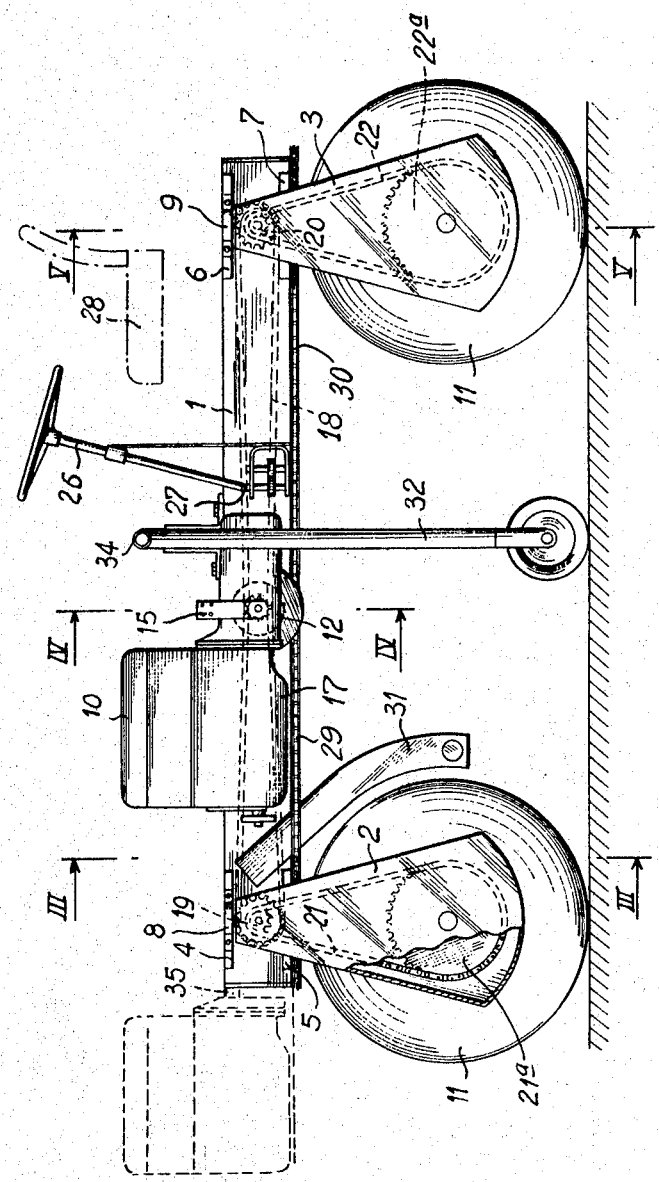

United States Patent Office 3,298,453
Patented Jan. 17, 1967

3,298,453
FRAME AND DRIVE ARRANGEMENT FOR AGRICULTURAL TRACTOR HAVING TWO WHEELS IN LINE
Emile Bobard, 17 Rue de Reon, Beaune, France
Filed Sept. 25, 1964, Ser. No. 399,137
Claims priority, application France, Sept. 27, 1963, 948,913
4 Claims. (Cl. 180—21)

The present invention relates to a frame for agricultural tractors having raised frames with two main supporting driving steered wheels disposed in line, and more particularly for tractors in which the wheels are respectively mounted at the bottom ends of two struts, the top ends of which support a raised frame on which there is mounted a sufficiently rigid transverse stabiliser axle effecting the lateral balancing of the tractor.

Tractors of this type generally have frames comprising two longitudinal side members connected by cross-members and braces of a rather complex nature (French Patent 1,118,073 of the applicant), because they must have very great rigidity. S:nce, on the one hand, the length of the frame of such tractors is very great in relation to the other dimensions, while on the other hand the driving forces are applied to wheels mounted at the ends of fairly tall struts, there is a lever arm action increasing the forces which frames of this type are required to withstand.

For example, when a tractor of this type is moved in a straight line by the driving power applied to the wheels, the frame is subjected to bending stresses in the common vertical plane of the wheels. When cornering, the frame is additionally subjected to torsional stresses through the action of the same forces diverted by the steering of the wheels in opposite directions.

Frames of this type are scarcely practical, because their complex structures must be achieved within a restricted volume; this results in great difficulties in assembly, access, and more generally in maintenance.

It was consequently important to provide a type of frame of relatively simple, unencumbered construction, which is nevertheless capable of absorbing under good conditions the bending and torsional stresses referred to above.

In tractors having wheels in line it has already been attempted to utilise frame elements in the form of open sections, but these elements did not possess sufficient rigidity and could be used only to supplement a main structure imparting to them the desired rigidity.

Tractors also exist in which the frame has a closed cross-section, but these are not equipped with wheels mounted on struts and do not have to withstand considerable torsional and bending stresses, so that the cross-section of said frame does not have the characteristics of the construction according to the present invention.

The present invention has the object of obviating these shortcomings, by providing a tractor of the described type with a simplified frame which nevertheless has great rigidity and which permits ready access for assembly and maintenance of the working parts.

To this end the applicant has improved tractors of the type having two main supporting driving and steering wheels disposed entirely beneath the bottom edge of the tractor chassis and supporting the latter by means of two struts the top ends of which are mounted on the chassis for pivoting about substantially vertical axes, and the bottom ends of which are equipped with means to receive wheels, while suitable transmission means are provided between said wheels and a power offtake point on the chassis, by providing such tractors with an elongated, tubular chassis having a closed cross-section, the height of said cross-section being greater than its width and said chassis being provided on one and the same side, near its ends, with laterally projecting bearing supports to receive the top ends of the struts on wh:ch the wheels are mounted.

This structure moreover enables the transmission means for driving the wheel to be accommodated inside the tubular chassis.

In addition, the chassis may be equipped with mounting means for supporting an engine/gearbox/differential unit at said one side of the chassis in the space left free between the laterally projecting bearing supports pivotally supporting the top ends of the wheel struts, whereby the lateral extent of the wheels-frame-motor structure is not greater than that of the frame alone.

In a preferred embodiment of the invention the bearing supports supporting the top ends of the wheel struts are each constituted by a pair of horizontal lugs or ears extending laterally from the top and bottom edges of the tubular chassis and each provided with an aperture so as to form bearings for pivots at the top ends of the struts, each of said lugs being composed of two parts joined together along a diametral plane of the opening, namely on the one hand a gusset fixed to the chassis and on the other hand a removable cap, the latter permitting easy and rapid dismantling of the struts.

Moreover, in order that the transmission between the gearbox and the wheels will not be affected by possible torsional stresses distorting the chassis, the engine/gearbox/differential unit has lateral outlet shaft journalled, at one end, in the chassis and having its other end supported in a depending outer portion of an arm extending laterally from the chassis.

Other characteristics and advantages of the invention will be apparent in the following description of an illustrative embodiment, which is given without any limitation, with reference to the accompanying drawings, in wh:ch:

FIGURE 1 is a diagrammatic side elevational view of a preferred form of construction of a tractor according to the invention;

FIGURE 2 shows a view from above of the tractor illustrated in FIGURE 1;

FIGURE 3 is a transverse sectional view taken along the line III—III on FIGURE 1;

FIGURE 4 is a transverse sectional view taken along the line IV—IV on FIGURE 1; and FIGURE 5 is a transverse sectional view taken along the line V—V on FIGURE 1.

FIGURES 1 and 2 show a tractor which essentially comprises a tubular chassis 1 of rectangular section on which by means of vertical pivots the top ends of two struts 2 and 3 are articulated.

The means pivotally connecting the top ends of the struts 2 and 3 to the chassis 1 are composed of two pairs of horizontal vertically spaced lugs 4, 5 and 6, 7 extending laterally from one side of chassis 1 adjacent the opposite ends thereof (FIGURE 1). The lugs or ears 4 and 5 and the lugs or ears 6 and 7 have vertically aligned apertures forming, in pairs, bearings for pivots 8 and 9 of the struts 2 and 3.

Each of these lugs is composed of two parts: that is, a gusset fixed to chassis 1 at its upper or lower edge, and a removable bearing cap for permitting easy and rapid dismantling of the strut.

An engine 10 fixed to the tubular chassis 1, as hereinafter described, drives wheels 11 mounted on the bottom parts of the struts 2 and 3, through a conventional gearbox 12 and gears, which will be described in detail hereinbelow.

The engine 10, which is of the lateral outlet type, is mounted at the same side of chassis 1 as the ears 4–7 by means of the following three elements:

The bearing 14 through which one end of the lateral output shaft 13 enters the tubular chassis 1 (FIGURE 4);

An arm 15 fixed above the chassis 1 and extending laterally from the chassis to a depending outer portion which supports the other end of lateral output shaft 13;

And a seating bracket 16 extending laterally from chassis 1 situated at the front of the engine and supporting the front end of the engine shaft in a laterally elongated eye (FIGURE 3).

Transmission from the gearbox 12 to the driving and steered wheels is effected by two chains 17 and 18 received inside the tubular chassis 1, which forms a casing.

These chains 17 and 18 are driven by sprockets on the end of shaft 13 in the chassis and impart a rotational movement to sprockets 19 and 20 mounted respectively at the top ends of the struts 2 and 3 by way of lateral shafts extending from chassis 1, as shown on FIGURE 5, and having universal or cardan joints 23 and 24, respectively, interposed therein at the pivoting axes of the struts 2 and 3. In turn, sprockets 19 and 20 drive chains 21 and 22 which are received in the vertical struts 2 and 3 and run around drive sprockets 21a and 22a connected with the wheels 11.

The struts 2 and 3 constitute casings keeping the chains 21 and 22 clean and protecting them against damage caused by the use of the tractor on difficult ground.

A brake disc 25 is mounted on the shaft 13 driving the transmission chains 17 and 18 concealed inside the section 1. The brake jaws (not shown) are advantageously mounted under the support arm 15.

The vehicle is steered by means of a steering wheel 26 provided with a steering gear 27; the driver's seat 28 is situated behind the steering wheel.

In addition to the steering wheel 26 and gear 27, the steering system comprises two chains 29 and 30 running around sprockets 29a and 30a (FIGURE 2) fixed to the struts 2 and 3 concentric with the pivoting axes thereof and enabling the rotation of each of the two wheels about a substantially vertical axis and in opposite directions to one another to be controlled.

In addition, a tow arm 31 for tools, particularly agricultural tools, is fixed to one side of the tubular chassis 1 between the two wheels, for example, just behind the front wheel, as shown, and thus is offset in relation to the chassis.

Moreover, the line of contact of the wheels on the ground passes through the point of attachment of the tools; so that, however great the forces applied to this arm by the ground resistance, no lateral tractive unbalancing is applied to the chassis.

However, the chassis 1 is provided with means intended to receive, preferably in a removable manner, a stabiliser axle 32–33, which is advantageously situated in the transverse plane passing through the center of the tractor.

In addition, means 34 intended to fix the stabiliser axle 32, 33 to the chassis are mounted oscillatably in a horizontal plane in relation to the chassis, so as to permit certain types of cultivation using a plurality of tools, in which case it is advantageous for the two driving wheels, which are usually in line, to be offset transversely.

The present invention is not limited to the specific embodiment described above, and it is apparent that changes and modifications may be made therein by one skilled in the art without departing from the scope or spirit of the invention.

In particular, it can readily be conceived that in order to load the front driving wheel and give it additional traction, the engine 10 may be mounted in front of the front wheel 11, in which case a coupling shaft 35 of suitable length is provided to effect the transmission between the engine 10 and the gearbox 12.

Moreover, at least one other towing arm (not shown) preferably a removable arm, may be fixed behind the rear wheel in the same manner as the arm 31.

In addition, the means with which the chassis is equipped for the purpose of receiving and fixing a stabiliser axle may be selected from a range of various sizes.

Finally, the chassis supported by two wheels in line as described above may be associated side-by-side with one or more tractor units of the same type in order to constitute a more powerful tractor, instead of using a stabiliser axle.

What I claim is:

1. In an agricultural tractor or the like of the kind having two steering and driving main wheels arranged in line, and an engine and gearing set for driving said main wheels; the combination of an elongated tubular chassis disposed entirely above said wheels and which is greater in height than in width, bearing supports projecting laterally from one side of said chassis adjacent the opposite ends thereof and carrying bearings which are laterally offset from said chassis at said one side thereof, depending struts mounted at said upper ends by said bearings for turning relative to said upper chassis about vertical axes concentric with said bearings and having means at the lower ends of said struts for rotatably mounting said main wheels thereon at the sides of said struts facing toward said chassis to dispose said chassis and said struts at opposite sides of a vertical medial plane of said wheels which contains said vertical axes about which said struts are turnable, and mounting means for said engine and gearing set projecting laterally from said one side of the chassis between said bearing supports and supporting said set at said one side of the chassis between said main wheels so that the center of gravity of the tractor is substantially situated in said vertical medial plane of the main wheels.

2. In an agricultural tractor or the like, the combination according to claim 1; wherein said engine and gearing set has a lateral output shaft extending into said tubular chassis, and further comprising transmission means for driving said main wheels from said output shaft including sprockets on said output shaft within said tubular chassis and drive chains engaged by said sprockets and extending longitudinally within said tubular chassis.

3. In an agricultural tractor or the like, the combination according to claim 1; wherein each of said bearing supports includes a pair of vertically spaced, parallel ears extending laterally from said one side of the chassis adjacent the top and bottom of the latter and carrying the respective bearing.

4. In an agricultural tractor or the like, the combination according to claim 1; wherein said engine and gearing set has a lateral output shaft projecting therefrom adjacent one end of the set and a longitudinal shaft projecting from the other end of said set; and said mounting means for the engine and gearing set includes bearing means in said one side of said chassis receiving one end of said lateral output shaft, an arm extending laterally from the top of said chassis over said set and having a depending outer portion in which the other end of said lateral output shaft is journalled, and a bracket extending laterally from said one side of the chassis and having a laterally elongated slot receiving said longitudinal shaft projecting from said set so that deflections of said chassis are not transmitted to said engine and gearing set through said mounting means therefor.

References Cited by the Examiner

UNITED STATES PATENTS

| | | | |
|---|---|---|---|
| 1,336,823 | 4/1920 | Dessaules | 180—21 |
| 2,789,646 | 4/1957 | Bobard. | |
| 2,936,035 | 5/1960 | Hill | 180—14 |
| 2,955,665 | 10/1960 | L'Heureux | 180—14 |
| 3,085,644 | 5/1963 | Lely | 180—25 X |

FOREIGN PATENTS

| | | |
|---|---|---|
| 1,162,201 | 5/1958 | France. |
| 822,338 | 10/1959 | Great Britain. |

KENNETH H. BETTS, *Primary Examiner.*